United States Patent
Hedrick et al.

(10) Patent No.: US 7,902,101 B2
(45) Date of Patent: Mar. 8, 2011

(54) PROCESS FOR REGENERATING CATALYST

(75) Inventors: Brian W. Hedrick, Oregon, IL (US); Robert L. Mehlberg, Wheaton, IL (US); Daniel R. Johnson, Schaumburg, IL (US); Mohammad Reza Mostofi-Ashtiani, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 729 days.

(21) Appl. No.: 11/950,909

(22) Filed: Dec. 5, 2007

(65) Prior Publication Data

US 2009/0149315 A1    Jun. 11, 2009

(51) Int. Cl.
*B01J 38/02*    (2006.01)

(52) U.S. Cl. ............ 502/56; 502/439; 502/514; 502/518

(58) Field of Classification Search ............... 502/56, 502/439, 514, 518
See application file for complete search history.

(56) References Cited

U.S. PATENT DOCUMENTS

| | | | |
|---|---|---|---|
| 3,844,973 A | 10/1974 | Stine et al. | 252/417 |
| 3,923,686 A | 12/1975 | Stine et al. | 252/417 |
| 4,197,189 A | 4/1980 | Thompson et al. | 208/164 |
| 4,272,402 A | 6/1981 | Mayes | 252/417 |
| 4,336,160 A | 6/1982 | Dean et al. | 252/417 |
| 4,397,738 A | 8/1983 | Kemp | 208/161 |
| 4,430,201 A | 2/1984 | Castagnos et al. | 208/164 |
| 4,482,451 A | 11/1984 | Kemp | 208/161 |
| 4,581,205 A | 4/1986 | Schatz | 422/113 |
| 4,689,206 A | 8/1987 | Owen et al. | 422/144 |
| 5,158,919 A | 10/1992 | Haddad et al. | 502/44 |
| 5,800,697 A | 9/1998 | Lengemann | 208/159 |

*Primary Examiner* — Edward M Johnson
(74) *Attorney, Agent, or Firm* — James C Paschall

(57) ABSTRACT

Disclosed is a process for disengaging regenerated catalyst from flue gas in a catalyst regenerator so as to avoid re-entrainment of catalyst that has settled into a bed in the catalyst regenerator using a disengaging device. A disengaging arm of the disengaging device has an outer shell that encloses the arm, an inner shell with a slot for allowing catalyst and flue gas to exit the arm and an outer baffle having a lower edge located below the opening in the outer wall. The baffle directs the catalyst and flue gas downwardly and limits radial flow. Catalyst and flue gas enter the disengaging arm through an opening in an outer wall of a riser section at a first superficial velocity and exits through a slot in a bottom of the disengaging arm at no more than 1.33 the first superficial velocity.

8 Claims, 4 Drawing Sheets

PROCESS FOR REGENERATING CATALYST

BACKGROUND OF THE INVENTION

The invention relates to a process of regenerating spent hydrocarbon conversion catalyst by the combustion of coke on the catalyst in a fluidized combustion zone. This invention specifically relates to a process for the conversion of heavy hydrocarbons into lighter hydrocarbons with a fluidized stream of catalyst particles and regeneration of the catalyst particles to remove coke that acts to deactivate the catalyst.

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke is deposited on the catalyst. A high temperature regeneration within a regeneration zone operation burns coke from the catalyst. Coke-containing catalyst, referred to herein as spent catalyst, is continually removed from the reaction zone and replaced by essentially coke-free catalyst from the regeneration zone. Fluidization of the catalyst particles by various gaseous streams allows the transport of catalyst between the reaction zone and regeneration zone.

A common objective of these configurations is maximizing product yield from the reactor while minimizing operating and equipment costs. Optimization of feedstock conversion ordinarily requires essentially complete removal of coke from the catalyst. This essentially complete removal of coke from catalyst is often referred to as complete regeneration. Complete regeneration produces a catalyst having less than 0.1 and preferably less than 0.05 wt-% coke. In order to obtain complete regeneration, the catalyst has to be in contact with oxygen for sufficient residence time to permit thorough combustion.

Conventional regenerators typically include a vessel having a spent catalyst inlet, a regenerated catalyst outlet and a distributor for supplying air to the bed of catalyst that resides in the vessel. Cyclone separators remove catalyst entrained in the spent combustion gas before the gas exits the regenerator vessel. In a dense catalyst bed, also known as a bubbling bed, combustion gas forms bubbles that ascend through a discernible top surface of a dense catalyst bed. Relatively little catalyst is entrained in the combustion gas exiting the dense bed.

One way to obtain fully regenerated catalyst is by performing the regeneration in stages. The use of relatively dilute phase regeneration zones to effect complete catalyst regeneration is shown in U.S. Pat. Nos. 4,430,201; 3,844,973 and 3,923,686. These patents teach a lower dense bed to which combustion gas is distributed and an upper transport zone. A two-stage system that combines a relatively dilute phase transport zone without a lower dense bed zone for regenerating catalyst is shown in U.S. Pat. Nos. 5,158,919 and 4,272,402. These patents all teach an upper dense bed into which the at least partially regenerated catalyst exiting from the transport zone collects. U.S. Pat. Nos. 4,197,189 and 4,336,160 teach a riser combustion zone in which fast fluidized flow conditions are maintained to effect complete combustion without the need for the additional combustion in the catalyst bed collected from the top of the riser.

In regenerators that have two or more chambers typically separated by a riser section, a riser termination device may be used to roughly separate most of the at least partially regenerated catalyst from the flue gas that is generated upon combustion of coke deposits. A tee disengager is a riser termination device that has one or more arms extending from and in downstream communication with the riser. An opening in the arm discharges regenerated catalyst and flue gas downwardly to roughly separate the descending heavier catalyst from the lighter flue gas that tends to ascend in a second or typically, upper chamber. An example of a tee disengager is shown in U.S. Pat. No. 5,800,697.

Another type of riser termination device used on FCC reactors comprises two or more tubes which extend from an opening in the riser and turn downwardly. Regenerated catalyst and product gases exit an opening in the end of the tube discharging downwardly. Examples of such riser termination devices are in U.S. Pat. Nos. 4,397,738; 4,482,451; 4,581,205 and 4,689,206.

As greater demands are placed on FCC units, regenerator vessels are being required to handle greater catalyst throughput. Greater quantities of combustion gas are added to the regenerator vessels to combust greater quantities of catalyst. As combustion gas flow rates are increased, so does the flow rate of catalyst exiting the riser termination device increase.

SUMMARY OF THE INVENTION

We have found that as regenerator vessels are getting larger and throughput is increased in the catalyst regenerator, the flue gas exiting the riser through a tee disengager into a disengaging chamber is sweeping catalyst that has collected in a bed in the bottom of the chamber. The swept up catalyst is becoming re-entrained in the ascending flue gas. This phenomenon is due to increased disengager discharge velocities from the riser and greater radial gas velocities over the catalyst fluidized bed. As a result, catalyst that had already been separated from flue gas has to be re-separated in the cyclone separators in the vessel which is overloading the cyclone separators and reducing their separation efficiency. We have discovered that a curved disengager with a relatively large discharge opening and a vertical baffle limits radial flow and directs the discharged catalyst downwardly to the bed. The greatly reduced radial velocity of the flue gas across the catalyst bed minimizes the tendency of the flue gas to sweep catalyst in the bed into re-entrainment.

DETAILED DESCRIPTION OF THE INVENTION

Figure 1:
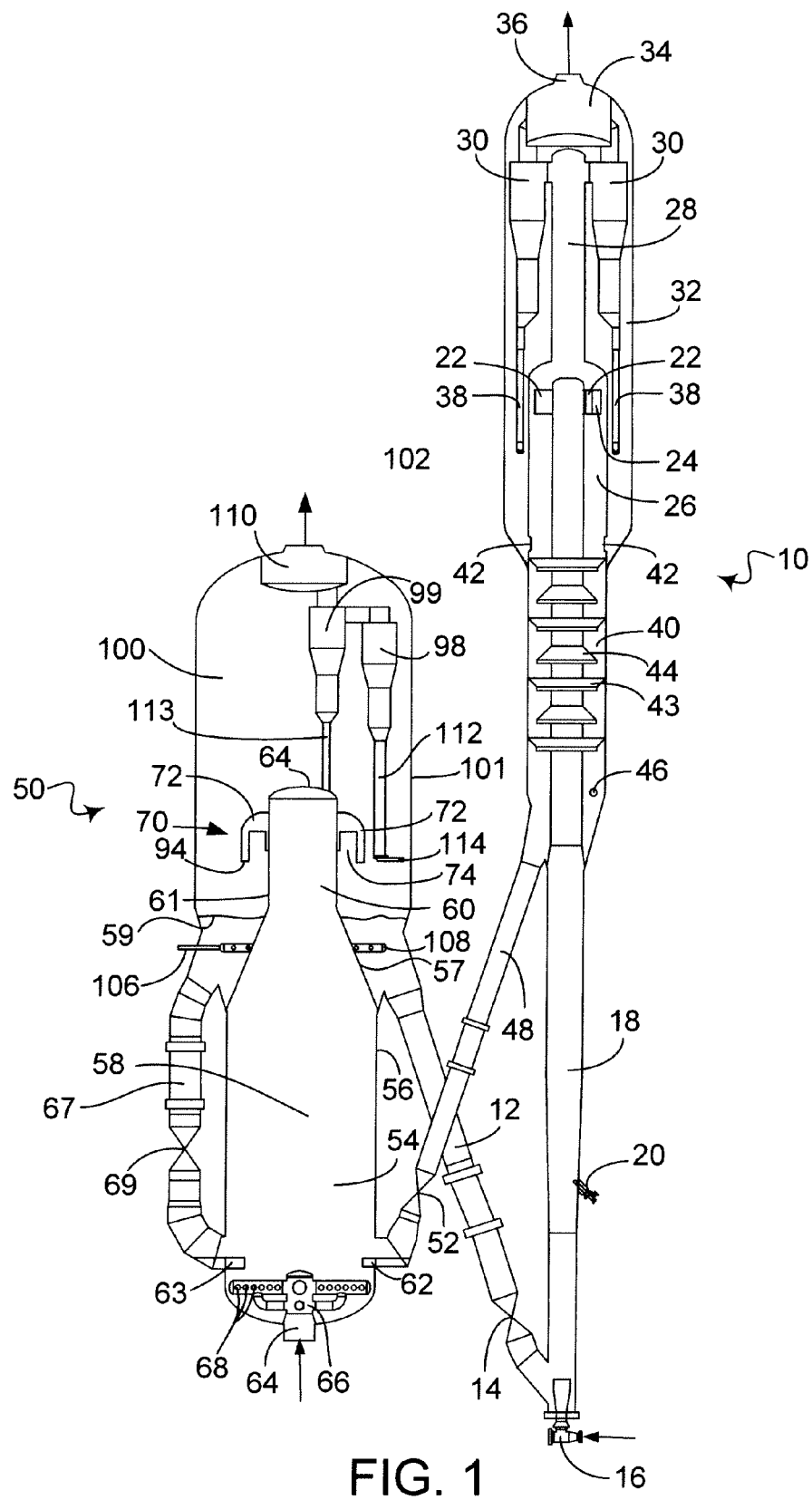
FIG. 1 is a schematic, elevational view of an FCC unit incorporating the present invention.

The process of the present invention may be embodied in an FCC unit. FIG. 1 shows an FCC unit that includes a reactor vessel 10 and a regenerator vessel 50. A regenerator standpipe 12 transfers catalyst from the regenerator vessel 50 at a rate regulated by a slide valve 14 to the reactor vessel 10. A fluidization medium such as steam from a nozzle 16 transports catalyst upwardly through a riser 18 at a relatively high density until a plurality of feed injection nozzles 20 (only one is shown) inject feed across the flowing stream of catalyst particles.

A conventional FCC feedstock or higher boiling hydrocarbon feedstock are suitable feeds. The most common of such conventional feedstocks is a "vacuum gas oil" (VGO), which is typically a hydrocarbon material having a boiling range of from 343 to 552° C. (650 to 1025° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen crude oil, shale oil, tar sand extract, deasphalted residue, products from coal liquefaction, atmospheric and vacuum reduced crudes. Heavy feedstocks for this invention also include mixtures of the above hydrocarbons and the foregoing list is not comprehensive.

The resulting mixture continues upwardly through the riser 18 to a top at which a pair of disengaging arms 22 tangentially and horizontally discharge the mixture of gas and catalyst from a top of the riser 18 through ports 24 into a disengaging vessel 26 that effects separation of gases from the catalyst. A transport conduit 28 carries the hydrocarbon vapors, including stripped hydrocarbons, stripping media and entrained catalyst to one or more cyclones 30 in a separator vessel 32 which separates spent catalyst from the hydrocarbon vapor stream. A collection chamber 34 in the separator vessel 32 gathers the separated hydrocarbon vapor streams from the cyclones 30 for passage to an outlet nozzle 36 and eventually into a fractionation recovery zone (not shown). Diplegs 38 discharge catalyst from the cyclones 30 into a lower portion of the separator vessel 32 that eventually passes the catalyst and adsorbed or entrained hydrocarbons into a stripping section 40 across ports 42 defined in a wall of the disengaging vessel 26. Catalyst separated in the disengaging vessel 26 passes directly into the stripping section 40. The stripping section 40 contains baffles 43, 44 or other equipment to promote mixing between a stripping gas and the catalyst. The stripping gas enters a lower portion of the stripping section 40 through at least one inlet 46 to one or more distributors (not shown). The spent catalyst leaves the stripping section 40 through a reactor conduit 48 and passes into the regenerator vessel 50 at a rate regulated by a slide valve 52.

The regenerator vessel 50 may be a combustor type of regenerator, which may use hybrid turbulent bed-fast fluidized conditions in a high-efficiency regenerator vessel 50 for completely regenerating spent catalyst. However, other regenerator vessels and other flow conditions may be suitable for the present invention. The reactor conduit 48 feeds spent catalyst to a first or lower chamber 54 defined by outer wall 56 through a spent catalyst inlet chute 62. The spent catalyst from the reactor vessel 10 usually contains carbon in an amount of from 0.2 to 2 wt-%, which is present in the form of coke. Although coke is primarily composed of carbon, it may contain from 3 to 12 wt-% hydrogen as well as sulfur and other materials. An oxygen-containing combustion gas, typically air, enters the first chamber 54 of the regenerator vessel 50 through a conduit 64 and is distributed by a distributor 66. Openings 68 in the distributor 66 emit combustion gas. As the combustion gas enters a combustion section 58, it contacts spent catalyst entering from chute 62 and lifts the catalyst at a superficial velocity of combustion gas in the first chamber 54 of at least 1.1 l/s (3.5 ft/s) under fast fluidized flow conditions. In an embodiment, the combustion section 58 will have a catalyst density of from 48 to 320 kg/m$^3$ (3 to 20 lb/ft$^3$) and a superficial gas velocity of 1.1 to 2.2 m/s (3.5 to 7 ft/s). The oxygen in the combustion gas contacts the spent catalyst and combusts carbonaceous deposits from the catalyst to at least partially regenerate the catalyst and generate flue gas.

In an embodiment, to accelerate combustion of the coke in the first chamber 54, hot regenerated catalyst from a dense catalyst bed 59 in an upper or second chamber 100 may be recirculated into the first chamber 54 via an external recycle standpipe 67 regulated by a control valve 69. Hot regenerated catalyst enters the regenerator chamber 54 through an inlet chute 63. Recirculation of regenerated catalyst, by mixing hot catalyst from the dense catalyst bed 59 with relatively cold spent catalyst from the reactor conduit 48 entering the first chamber 54, raises the overall temperature of the catalyst and gas mixture in the first chamber 54.

The mixture of catalyst and combustion gas in the first chamber 54 ascend from the combustion section 58 through a frustoconical transition section 57 to the transport, riser section 60 of the first chamber 54. The riser section is defined by an outer wall 61 to define a tube which is preferably cylindrical and extends preferably upwardly from the combustion chamber 54. The mixture of catalyst and gas travels at a higher superficial gas velocity than in the combustion section 58. The increased gas velocity is due to the reduced cross-sectional area of the riser section 60 relative to the cross-sectional area of the regenerator chamber 54 below the transition section 57. Hence, the superficial gas velocity will usually exceed about 2.2 m/s (7 ft/s). The riser section 60 will have a lower catalyst density of less than about 80 kg/m$^3$ (5 lb/ft$^3$).

The regenerator vessel 50 also includes an upper or second chamber 100. The mixture of catalyst particles and flue gas is discharged from an upper portion of the riser section 60 into the separation chamber 100. Substantially completely regenerated catalyst may exit the top of the transport, riser section 60, but arrangements in which partially regenerated catalyst exits from the first chamber 54 are also contemplated. Discharge is effected through a disengaging device 70 that separates a majority of the regenerated catalyst from the flue gas. Initial separation of catalyst upon exiting the riser section 60 minimizes the catalyst loading on cyclone separators 98, 99 or other downstream devices used for the essentially complete removal of catalyst particles from the flue gas, thereby reducing overall equipment costs. In an embodiment, catalyst and gas flowing up the riser section 60 impact a top elliptical cap 64 of the riser section 60 and reverse flow. The catalyst and gas then exit through downwardly directed openings 74 in radial disengaging arms 72 of the disengaging device 70. The sudden loss of momentum and downward flow reversal cause at least about 70 and preferably about 80 wt-% of the heavier catalyst to fall to the dense catalyst bed 59 and the lighter flue gas and a minor portion of the catalyst still entrained therein to ascend upwardly in the second chamber 100. Downwardly falling disengaged catalyst collects in the dense catalyst bed 59. Catalyst densities in the dense catalyst bed 59 are typically kept within a range of from about 640 to about 960 kg/m$^3$ (40 to 60 lb/ft$^3$). A fluidizing conduit 106 delivers fluidizing gas, typically air, to the dense catalyst bed 59 through a fluidizing distributor 108. In a combustor-style regenerator, approximately no more than 2% of the total gas requirements within the process enters the dense catalyst bed 59 through the fluidizing distributor 108. In this embodiment, gas is added here not for combustion purposes but only for fluidizing purposes so the catalyst will fluidly exit through the standpipes 67 and 12. The fluidizing gas added through the fluidizing distributor 108 may be combustion gas. In the case where partial combustion is effected in the first chamber 54, greater amounts of combustion gas will be fed to the second chamber 100 through conduit 106.

The combined flue and fluidizing gas and entrained particles of catalyst enter one or more separation means, such as the cyclone separators 98, 99, which separates catalyst fines from the gas. Flue gas, relatively free of catalyst is withdrawn from the regenerator vessel 50 through an exit conduit 110 while recovered catalyst is returned to the dense catalyst bed 59 through respective diplegs 112, 113 or other comparable means via outlet 114. A bottom edge 94 of a vertical baffle section 90 of the disengaging device 70 is preferably located at a depth that is at or lower than the depth of the outlets 114 of diplegs 112, 113 of the cyclones 98, 99, respectively, to assure catalyst is thrust below the cyclone dipleg exit.

From about 10 to 30 wt-% of the catalyst discharged from the regenerator chamber 54 is present in the gases above the exit from the riser section 60 and enter the cyclone separators 98, 99. Catalyst from the dense catalyst bed 59 is transferred through the regenerator standpipe 12 back to the reactor vessel 10 where it again contacts feed as the FCC process continues. The regenerator vessel of the present invention may typically require 14 kg of air per kg of coke removed to obtain complete regeneration. When more catalyst is regenerated, greater amounts of feed may be processed in a conventional reaction vessel. The regenerator vessel 50 typically has a temperature of about 594 to about 704° C. (1100 to 1300° F.) in the first chamber 54 and about 649 to about 760° C. (1200 to 1400° F.) in the second chamber 100.

Figure 2:
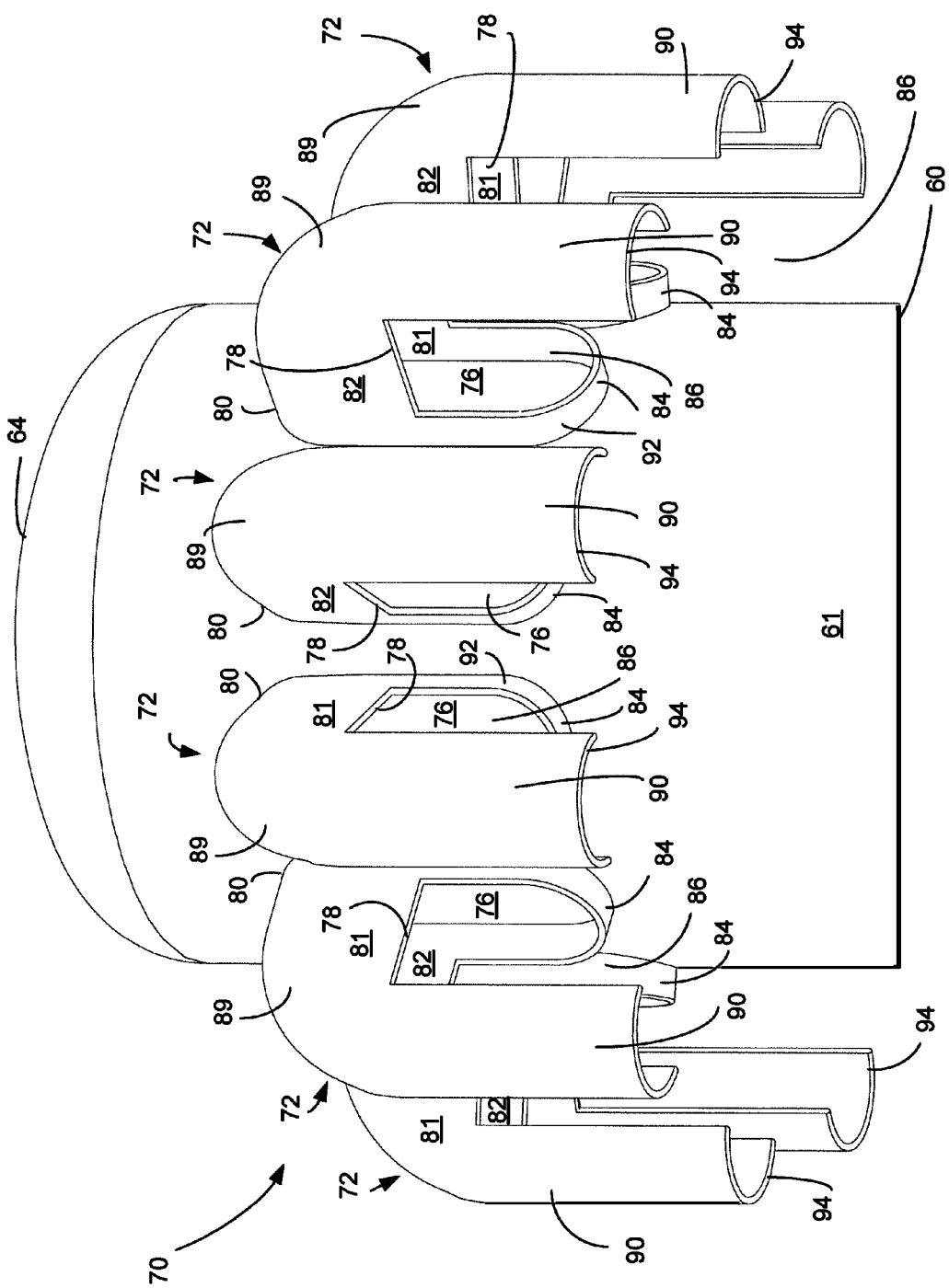
FIG. 2 is an isometric view of a disengaging device of FIG. 1.

FIG. 2 is an isometric view of the disengaging device 70. As the mixture of at least partially regenerated catalyst and flue gas are upwardly transported in the riser section 60, it encounters the top 64 and reverses direction. The mixture is propelled through a plurality of openings 76 in the outer wall 61 of the riser section 60 and enters respective ones of a plurality of disengaging arms 72. Two to eleven disengaging arms 72 may be used. More may be appropriate for even larger units. Each disengaging arm 72 radially extends from the outer wall 61 about a corresponding opening 76. The disengaging arm 72 has an outer shell 80 that encloses the arm. In an embodiment the outer shell 80 is curved about its axis. Each disengaging arm 70 also has opposed, side walls 81, 82, and an inner shell 84 that is curved about its axis and opposed to the outer shell 80. Recesses 78 are cut into the inner shell 84 and side walls 81, 82 to provide a slot 86 for the mixture of regenerated catalyst and flue gas to exit the disengaging arm 72 and enter the second chamber 100. The side walls 81, 82 are generally vertical and the recesses 78 preferably extend to a height that is at least half of the height of the side wall 81, 82. The outer shell 80 has a horizontal section 88, a turned section 89 and a vertical outer baffle section 90. The turned section 89 is curved downwardly as its length extends from the horizontal section 88 that radiates from the outer wall 61 of the riser 60. Like the horizontal section 88, the vertical outer baffle section 90 and the turned section 89 are also curved about their axes. The horizontal section 86 and the vertical baffle section 90 define semicylinders. The horizontal section 88, the turned section 89 and the vertical baffle section 90 are contiguous and together define a downwardly turned half pipe or semicylinder. Preferably, the horizontal section 86 and the vertical baffle section 90 define a right angle. Other angles may be suitable. An inner surface of the outer shell directs the exiting mixture of regenerated catalyst and flue gas horizontally due to the horizontal section 88, gradually turns the mixture from flowing outwardly to downwardly due to the turned section 89 and directs the mixture downwardly and minimizes outward flow due to the vertical baffle section 90. The turned section 89 curves the flow of catalyst downwardly as it travels radially away from said riser section 60. The recesses 78 defining the slot 86 are cut in the inner shell 84 and the side walls 81, 82 vertically below the horizontal section 88 and extends to the vertical baffle section 90. Consequently, the slot 86 is defined inwardly by an outer edge of the inner shell 84 and side walls 81, 82; upwardly by lower edges of the side walls 81, 82; and outwardly by an inner surface of the vertical baffle 90. The outer shell 80, side walls 81, 82 and the inner shell 84 define a band 92 about the opening 76 adjacent the wall 61 of the riser 60. The band 92 includes all of the inner shell 84. The slot 86 is disposed between the band 92 and the vertical baffle section 90. The horizontal section 88 of the outer shell 80, side walls 81, 82 and the inner shell 84 may define an obround cross-section which is interrupted by the slot 86. The vertical baffle section 90 has a lower edge 94 preferably located below the inner shell 84 and the opening 76. Refractory material may be layered on the outer wall 61 of the riser section 60 to protect the metal from erosion in the harsh, turbulent, catalyst environment. The refractory should be applied at least from just above the slots 76 to the level at which the riser section 60 emerges into the second chamber 100.

Figure 3:
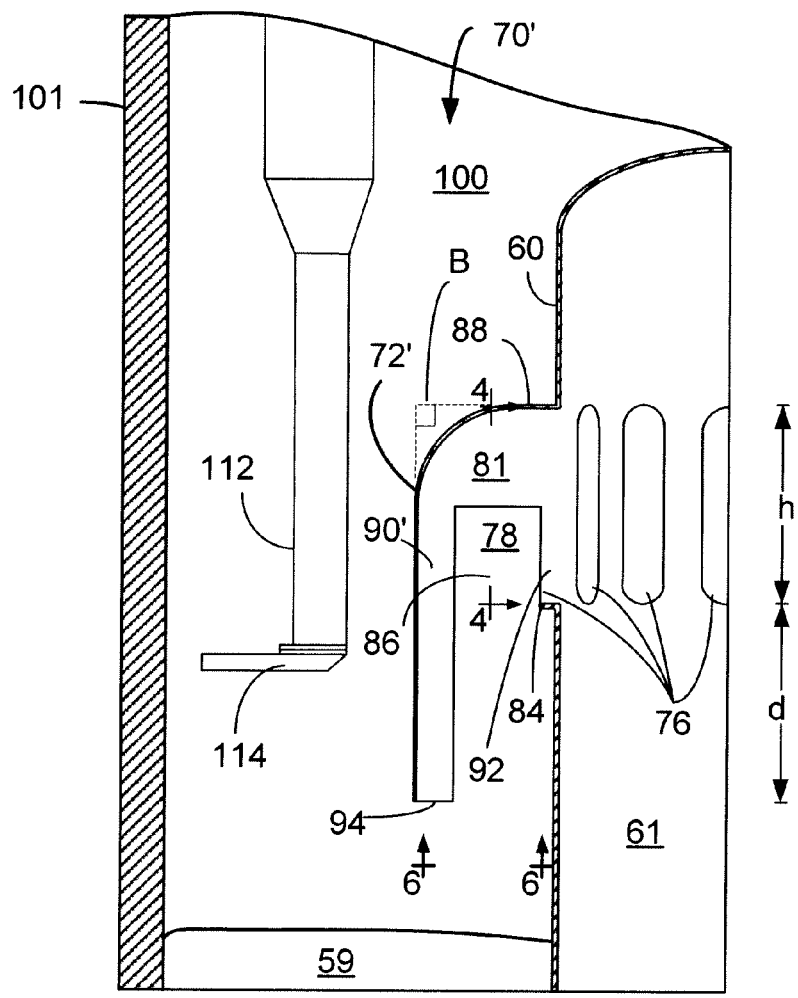
FIG. 3 is a partial side view of the disengaging device of FIG. 1.

FIG. 3 shows a cross section of a portion of the disengaging device 70'. Elements that have configurations that differ from the corresponding elements in FIGS. 1 and 2 are designated with a prime symbol ("'"). Otherwise, elements will have like reference numerals. FIG. 3 shows an embodiment of an extended vertical baffle section 90' with a lower edge 94 located below the opening 76 by a depth d of at least one-half of a vertical height h of the opening 76. Preferably, the depth d will be equal to or greater than the height h as shown in FIG. 3. The depth of the lower edge 94 is below the depth of the outlet 114 of the closest one and preferably all of the cyclone diplegs 112. The downwardly turned disengaging arms 72' are designed to propel the exiting mixture of regenerated catalyst and flue gas vertically, downwardly. Preferably, the mixture is propelled vertically downwardly, parallel to a side wall 101 of the second chamber 100. The vertical baffle section 90' is shown in FIG. 3 oriented parallel to the side wall 101, to the outer wall 61 of the riser section 60 and to the band 92. Directing the catalyst to vertically travel serves to mitigate the sweeping of catalyst from catalyst bed 59 back into entrainment with upwardly rising flue gas in the second chamber 100 which requires additional secondary separation in the cyclones 98, 99 that can occur with larger throughput. FIG. 3 also shows a preferred embodiment in which the horizontal section 86 and the vertical baffle section 90' define a right angle B.

Figure 4:
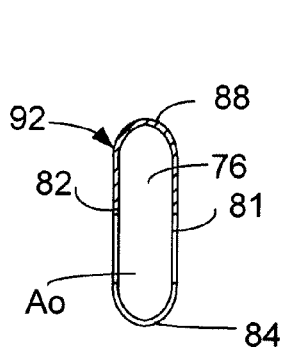
FIG. 4 is a sectional view taken from the segment 4-4 in FIG. 3.
Figure 5:
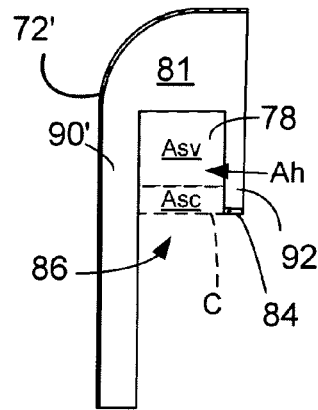
FIG. 5 is a partial view of FIG. 3.
Figure 6:
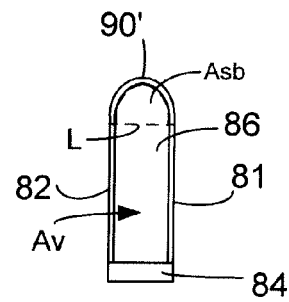
FIG. 6 is a partial view taken from the segment 6-6 in FIG. 3.

It is also important to ensure that the velocity of the mixture exiting the disengaging arm 72 is not too high. The mixture of regenerated catalyst and flue gas exit openings 76 into the respective disengaging arm 72 at a first superficial velocity. This first superficial velocity may suitably be about 5 to about 10 m/s and preferably about 5 to about 7 m/s, although other velocities may be suitable. It is suitable to emit regenerated catalyst and flue gas through the slot 86 in the disengaging arm 72 at a second superficial velocity that is no more than about 1.33 times the first superficial velocity, suitably, about 0.4 to about 1.33 times the first superficial velocity and preferably about 0.75 to 1.25 times the first superficial velocity. The second superficial velocity may be about 2 to about 13 m/s and preferably about 5 to about 7 m/s. The ratio of superficial velocities is a more meaningful criteria because other superficial velocities may be suitable. This ratio can be achieved by setting a ratio of a projected area of the slot 86 in the disengaging arm 72' to an area of the opening 76 in the wall 61 of the riser 60 of greater than about 0.75. The ratio may suitably be between about 0.75 and about 2.5 and is preferably between about 1.0 and 2.0. The area $A_O$ of the opening 76 is shown in FIG. 4 defined by the band 92 between the horizontal section 88 of the outer shell 80, the side walls 81 and 82 and the inner shell 84. The projected area $A_S$ of the slot 86 is the sum of three components, $A_{SV}$, $A_{SC}$ and $A_{sb}$. $A_{SV}$ is an area of the recesses 78 cut in both side walls 81 and 82 as shown in FIG. 5. $A_{SC}$ is an area of an imaginary outer surface C of the inner shell 84 were it projected into the slot 86 where the recesses 78 are as also shown in FIG. 5. In an embodiment, imaginary outer surface C would take a semi-cylindrical form like an embodiment of the inner shell 84. $A_{sb}$ is a horizontal cross-sectional area constrained by an inner surface of the outer vertical baffle 90' up to an imaginary line L between outer edges of recesses 78 as shown in FIG. 6. A vertical projection of the slot 86 defines the primary discharge path of the heavier catalyst from the disengaging arm 72. An area $A_V$ of the vertical projection is defined between the outer edge of the inner shell 84, the inner edges of two side walls 81, 82 and the inner surface of the outer baffle 90'. In an embodiment, $A_V$ may be 0.3 to 0.8 of $A_O$. The horizontal projection of the slot defines the primary discharge path of the lighter gases from the disengaging arm 72. An area $A_h$ of the horizontal projection is equal to two times the area of the recesses 78 defined in the side walls 81, 82 by outer edge of the band 92, inner edges of the vertical baffle section 90' and constrained below the lower edge in the side walls 81, 82 and above the projected bottom tangent of the inner shell 84. In an embodiment, $A_h$ may be 0.4 to 1.7 of $A_O$. A greater area $A_h$ of the horizontal projection, allows more vapor to exit the disengaging arm 72' horizontally through the slot 86 instead of vertically descending to encounter the catalyst bed 59.

Figure 7:
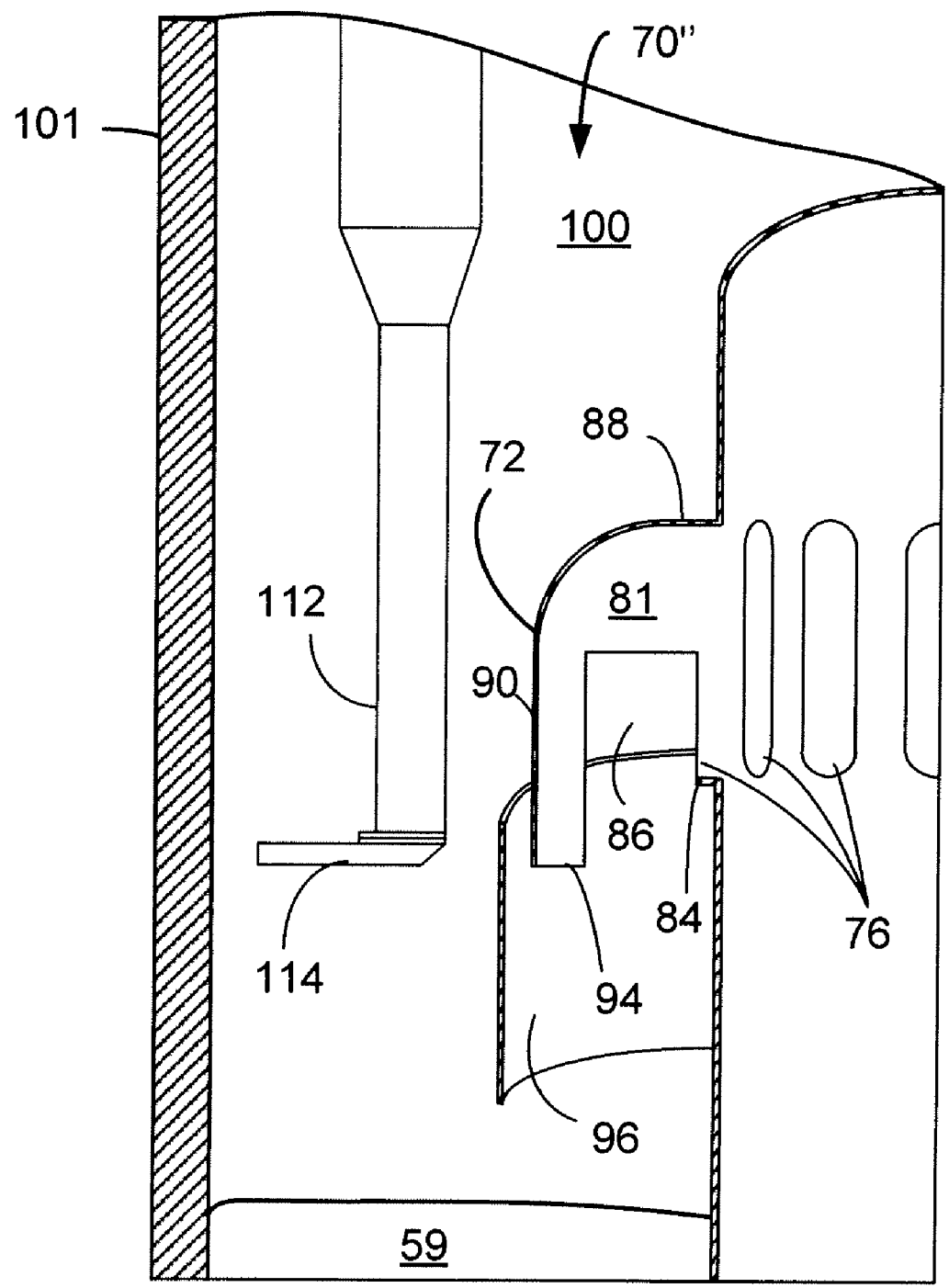
FIG. 7 is an alternative partial side view of the disengaging device of FIG. 1.

FIG. 7 illustrates an alternative embodiment in which a shield 96 is used instead of an extended outer baffle 90' as part of disengaging device 70". FIG. 7 shows a cross section of a portion of the disengaging device 70". Elements that have configurations that differ from the corresponding elements in FIGS. 1, 2 and 3 are designated with a double prime symbol ("''"). Otherwise, elements will have like reference numerals. The shield 96 surrounds the disengaging device 70" and it interposed between the disengaging arms 72 and the cyclone dipleg outlet 114. The shield 96 is preferably cylindrical and has a top edge above the bottom edge 94 of the outer baffle section 90. The shield 96 preferably has a bottom edge that is below the bottom edge 94 and the outlet 114 of the dipleg 112 and may extend all the way down to the catalyst bed 59.

The invention claimed is:

1. A process for regenerating spent catalyst comprising:
   feeding spent catalyst with carbonaceous deposits to a first chamber of a catalyst regenerator vessel;
   distributing combustion gas to said first chamber;
   contacting said spent catalyst and combustion gas;
   combusting carbonaceous deposits from said spent catalyst;
   providing at least partially regenerated catalyst;
   generating flue gas;
   transporting said regenerated catalyst and said flue gas through a riser section from said first chamber;
   emitting catalyst and flue gas through an opening in an outer wall of said riser section at a first superficial velocity into a disengaging arm radially extending from said outer wall;
   emitting catalyst and flue gas through a slot in said disengaging arm at a second superficial velocity that is no more that about 1.33 times the first superficial velocity; and
   disengaging said regenerated catalyst from said flue gas.

2. The process of claim 1 wherein said second superficial velocity is about 0.4 to about 1.33 times the first superficial velocity.

3. The process of claim 1 further comprising directing said catalyst outwardly through said disengaging arm and directing said catalyst downwardly out of said slot in said disengaging arm.

4. The process of claim 3 further comprising curving the flow of catalyst about a turn between the steps of directing the catalyst outwardly and directing the catalyst downwardly.

5. The process of claim 4 further comprising curving said flow of catalyst downwardly as it travels radially from said riser section.

6. A process for regenerating spent catalyst comprising:
   feeding spent catalyst with carbonaceous deposits to a first chamber of a catalyst regenerator vessel;
   distributing combustion gas to said first chamber;
   contacting said spent catalyst and combustion gas;
   combusting carbonaceous deposits from said spent catalyst;
   providing at least partially regenerated catalyst;
   generating flue gas;
   transporting said regenerated catalyst and said flue gas through a riser section from said first chamber;
   emitting catalyst and flue gas through an opening in an outer wall of said riser section;
   directing said catalyst outwardly through a disengaging arm;
   curving the flow of catalyst about a turn;
   directing said catalyst downwardly out of a slot in said disengaging arm; and
   disengaging said regenerated catalyst from said flue gas.

7. The process of claim 6 further comprising:
   emitting said catalyst and flue gas through said opening in said outer wall of said riser section at a first superficial velocity into said disengaging arm radially extending from said outer wall; and
   emitting said catalyst and flue gas through said slot in said disengaging arm at a second superficial velocity that is no more that about 1.33 times the first superficial velocity.

8. The process of claim 7 wherein said second superficial velocity is about 0.4 to about 1.33 times the first superficial velocity.

* * * * *